Jan. 17, 1956 P. WORMSER ET AL 2,731,051
MACHINES FOR ORIENTATING AND STEMMING FRUIT WITH STEMS
Filed July 25, 1950 6 Sheets-Sheet 2

INVENTORS
PAUL WORMSER
HERBERT E. METCALF
BY
Herbert E. Metcalf
THEIR PATENT ATTORNEY Jan. 17, 1956   P. WORMSER ET AL   2,731,051
MACHINES FOR ORIENTATING AND STEMMING FRUIT WITH STEMS
Filed July 25, 1950   6 Sheets-Sheet 3
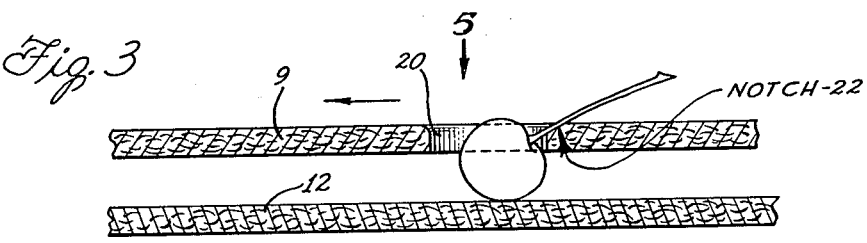
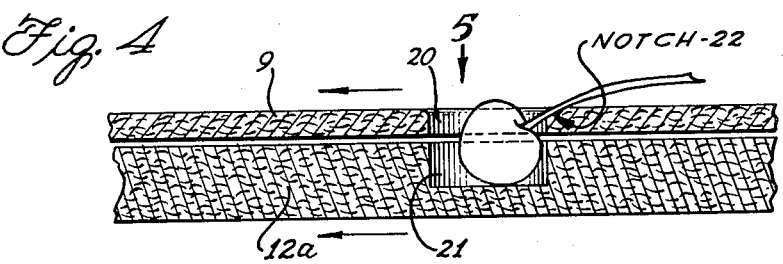
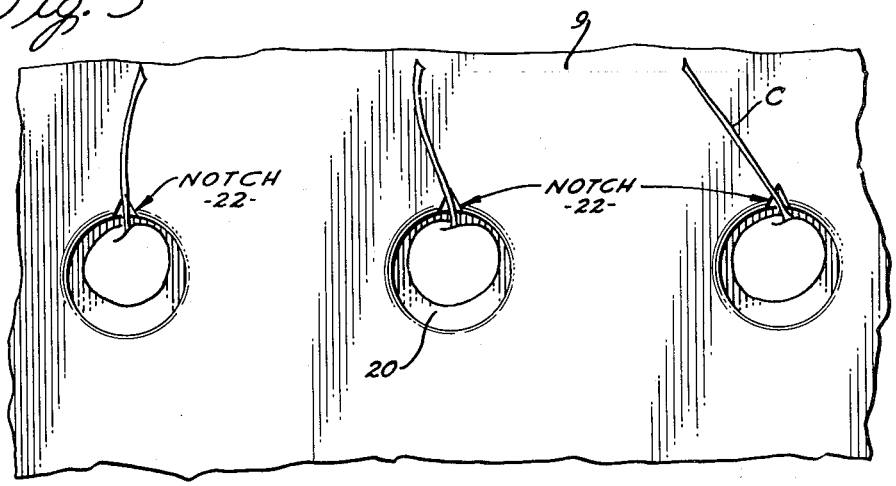
INVENTORS
PAUL WORMSER
HERBERT E. METCALF
BY
Herbert E. Metcalf
THEIR PATENT ATTORNEY

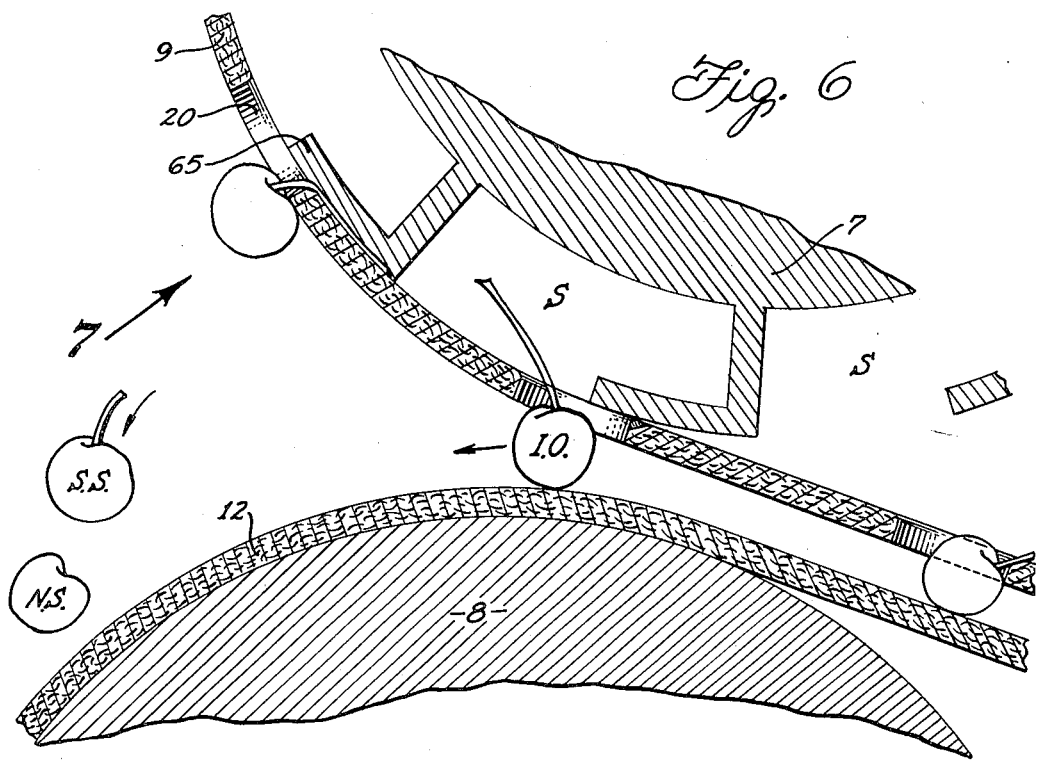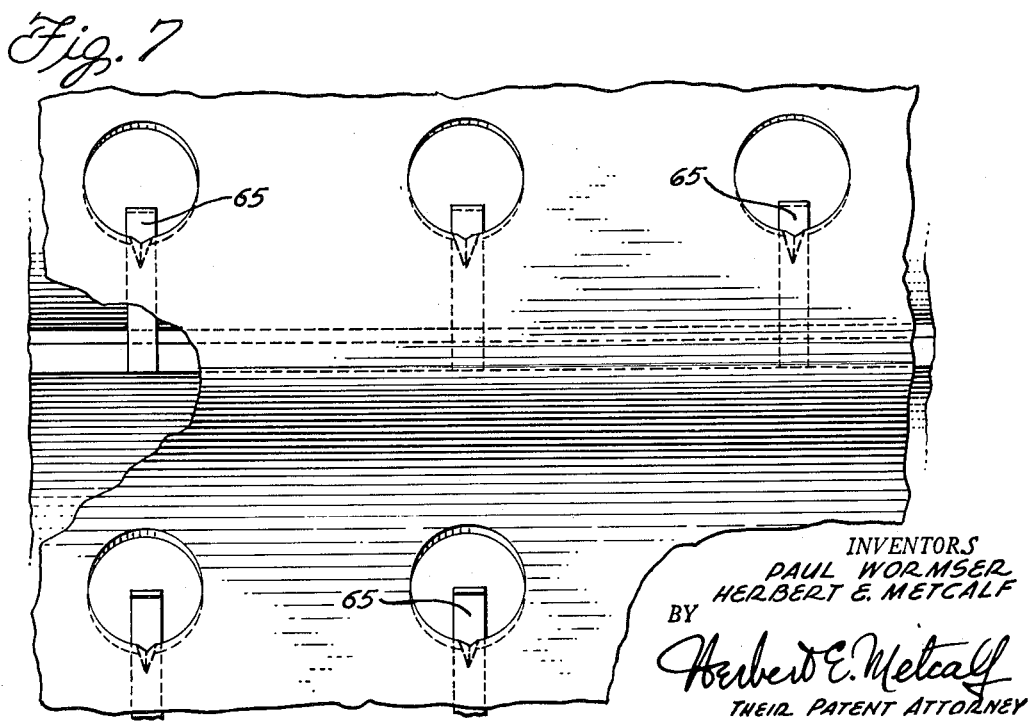

Jan. 17, 1956 P. WORMSER ET AL 2,731,051
MACHINES FOR ORIENTATING AND STEMMING FRUIT WITH STEMS
Filed July 25, 1950 6 Sheets-Sheet 5
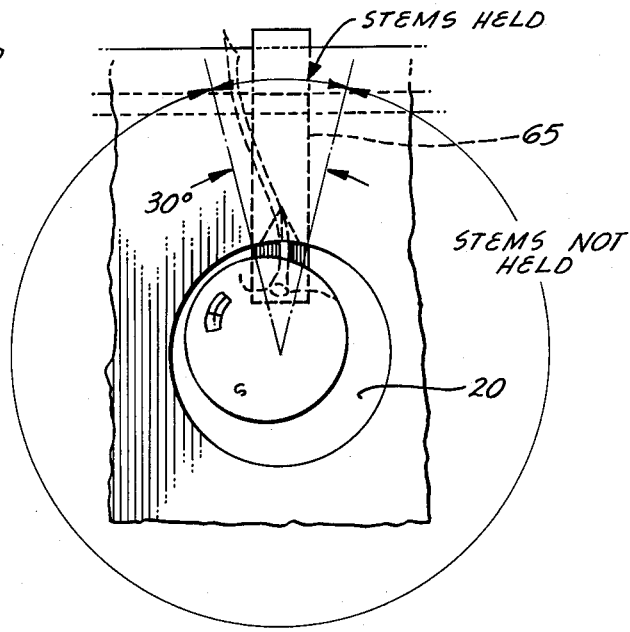
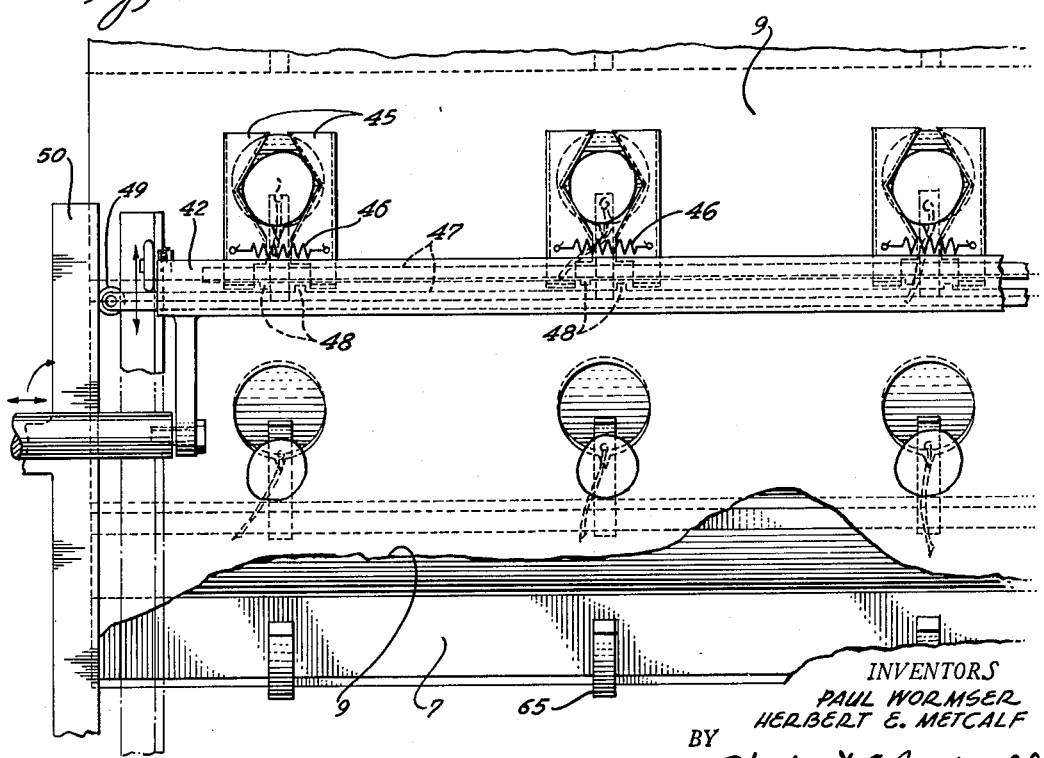
INVENTORS
PAUL WORMSER
HERBERT E. METCALF
BY
*Herbert E. Metcalf*
THEIR PATENT ATTORNEY Jan. 17, 1956  P. WORMSER ET AL  2,731,051
MACHINES FOR ORIENTATING AND STEMMING FRUIT WITH STEMS
Filed July 25, 1950  6 Sheets-Sheet 6
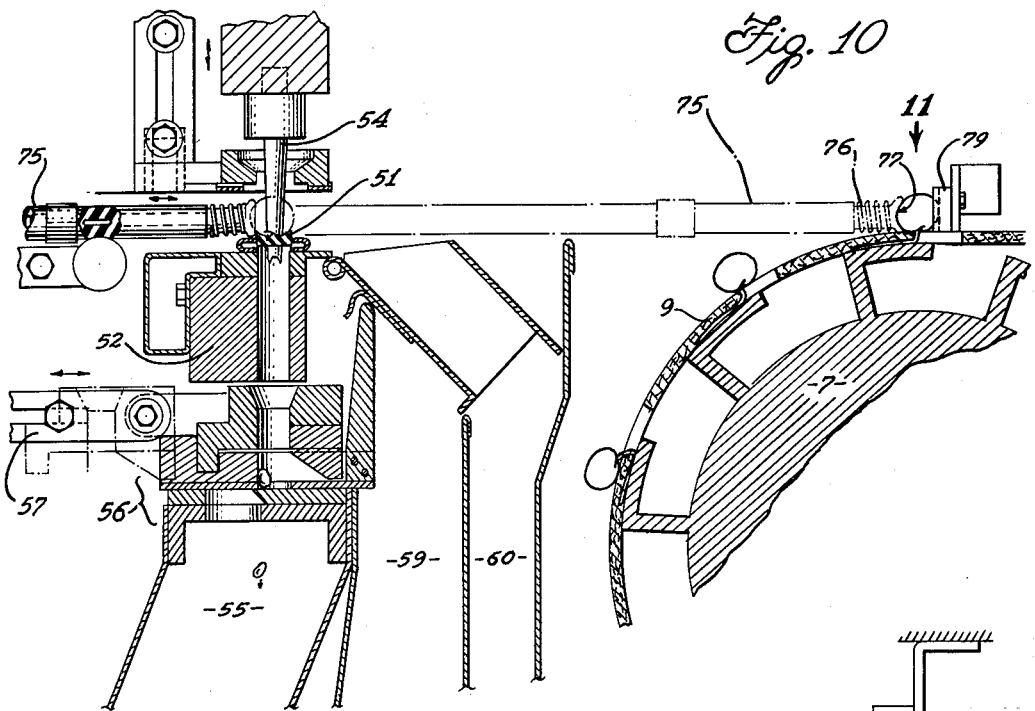
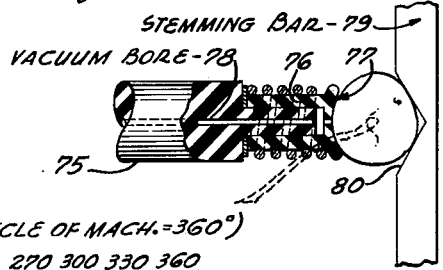
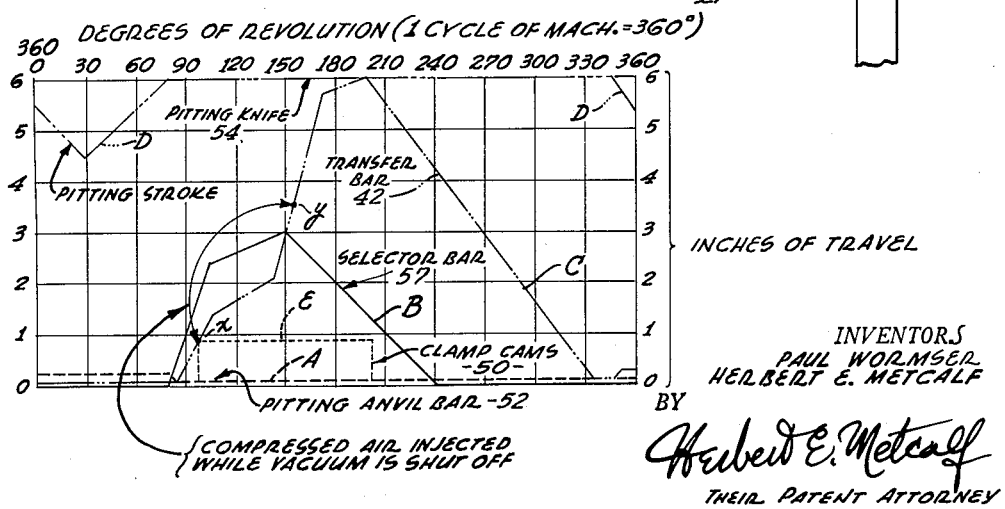
INVENTORS
PAUL WORMSER
HERBERT E. METCALF
BY
Herbert E. Metcalf
THEIR PATENT ATTORNEY

United States Patent Office 2,731,051
Patented Jan. 17, 1956

2,731,051

MACHINES FOR ORIENTATING AND STEMMING FRUIT WITH STEMS

Paul Wormser, San Francisco, and Herbert E. Metcalf, Los Angeles, Calif., assignors to S & W Fine Foods, Inc., San Francisco, Calif., a corporation of California Application July 25, 1950, Serial No. 175,674

6 Claims. (Cl. 146—55)

The present invention relates to machines for orientating fruit such as cherries, for example, so that the pit can be forced out of the fruit in the area of the stem indent, thereby providing a high quality pitted fruit of good appearance having a minimum loss of edible flesh.

Ordinarily, fruit to be pitted along the tip-stem indent axis so that the pit can be forced out through the stem indent area where the flesh is relatively thin, has been first stemmed, and then orientated prior to pitting, either by hand, or automatically by machines designed to rotate the fruit until a pilot member, on which at least a portion of the weight of the fruit is resting, enters the stem indent and prevents further rotation of the fruit. After the stem indent has thus been located, the fruit can be pitted through the orientated tip-stem-indent axis. An excellent example of such an orientation and pitting device is shown, described and claimed in the Carroll Patent No. 2,220,511, issued November 5, 1940.

Such machines require that the fruit to be orientated, such as cherries or plums, for example, be stemmed before orientation, and it is customary to provide separate machines for so stemming the fruit. Further, such machines require adequate indent depths for proper orientation and may also orientate on fruit surface indents other than stem indents, resulting in an improperly pitted fruit.

It is an object of the present invention to orientate fruit solely by the stem and to remove the stem from the fruit prior to pitting, meanwhile maintaining the fruit in orientated position, all in the same machine.

It is another object of the invention to provide a machine that will orientate fruit by stem position, remove the fruit from the stem, and then pit the fruit along the tip-stem indent axis.

It is still another object of the invention to provide a means for orientating fruit by the stems thereof and which will automatically discard fruit improperly orientated.

It is a further object of the invention to provide a completely automatic machine for orientating fruit having stems thereon, removing the stems from the orientated fruit, and pitting the destemmed fruit so that the pit is removed through the stem indent area, rapidly and continuously.

And it is a still further object of the invention to provide a machine to load, orientate, inspect, destem and pit in orientated position fruit having their stems attached thereto when loaded into the machine.

It is still a further object of the invention to provide a novel means for orientating and pitting stemmed fruit without orientation by the surface contour of said fruit.

It is another object of the invention to provide a means for removing fruit from their stems while said stems are being held in a predetermined position and for delivering the destemmed fruit to a pitting device in a position as determined by said stem position.

It is a further object of the invention to orientate fruit with their stems still attached thereto, to remove said fruit from their stems and to pit the fruit through the area from which the stem was removed.

The machine of the present invention utilizes in a preferred form a relatively thin upper carrier having apertures therein, backed by a second lower carrier forming with the apertures fruit receiving receptacles, the lower carrier being progressed at the same or slightly greater speed than the first carrier. Fruit with stems thereon such as cherries, fresh or brined, are loaded into the composite receptacles and are brushed to cause the stems to trail on the upper surface of the first carrier. At the trailing edge of each aperture, a notch is preferably provided into which the stem falls when properly located. Such notches prevent, in a large percentage of cases, the stems which have entered the notches from being removed therefrom by additional brushing. As the notches are at the edges of the apertures, the fruit is held with the stem indent thereof close to the notch, even though the stems are curved to a greater or less degree. The length of the first carrier brushed is made to be sufficient to cause substantially all stems capable of entering the notches to be so located. The fruit is then considered to be orientated as far as possible.

The two carriers are then separated. The upper carrier then rises upwardly around a gripping drum, and the lower carrier then drops downwardly around a mounting drum. The gripping drum is preferably provided with lugs contacting the upper carrier over areas including the notches, thereby holding all fruit having their stems in proper position by their stems when the stem is long enough to extend beyond the end of the notch. All other fruit is not gripped and falls out of the machine. Thus, all fruit with short stems and with stems not properly orientated are not gripped and do not enter into further operations of the machine, an automatic inspection feature.

The gripped fruit is then carried upwardly by the stems thereof, each fruit with the greater poriton of its body projecting outwardly from the carrier aperture. At the top of the gripper drum, the gripped fruit will have its stem indent down and its tip-stem indent axis substantially vertical. Transfer means are then provided to grasp the fruit in that position and to move the fruit preferably horizontally away from the gripper drum, thereby causing separation of the fruit from its stem. The grasped fruit is transported to a pitting knife preferably operating vertically and downwardly to force the pit out of the fruit through the indent area. The transport clamps shown in the above referenced Carroll application may be used for removal of the fruit from the drum, or the vacuum transport device shown, described and claimed in the Doering et al. application Serial No. 105,858, filed July 11, 1949, now U. S. Patent No. 2,635,662, dated April 21, 1953, may be utilized. In the latter case, due to the use of vacuum to hold the fruit, it is preferred to aid the separation of the fruit from the stem by a break-off bar positioned to stop the fruit from rotating with the drum just as the fruit is grasped for transfer.

The machine just above described is not dependent in any way on fruit surface contour, fruit size or general shape for orientation, is self-inspecting, and except for couples (twin fruits) and other grossly misshapen fruit, will provide 100% properly orientated and pitted fruit within desired ranges.

The preferred machine as above generally described, together with other objects and advantages of the invention, will next be described in detail, together with certain modifications, by reference to the appended drawings, in which:

Figure 3 is an enlarged longitudinal sectional view taken along the line 3—3 of Figure 2, of portions of carrier belts that can be used in the machine of Figure 1.

Figure 4 is a longitudinal sectional view of portions of another type of a carrier belt combination that can be used in the machine of Figure 1.

Figure 5 is a top plan view of the stem positioning notches as used on the carrier belt combinations of Figures 3 and 4.

Figure 6 is an enlarged longitudinal vertical sectional view taken along the line 6—6 of Figure 2, of the stem gripping drum of the machine of Figure 1 showing how position inspection can be accomplished.

Figure 7 is an elevational view taken as indicated by the arrow 7 in Figure 6.

Figure 8 is a diagram showing how position inspection is accomplished by the use of the device shown in Figures 6 and 7.

Figure 9 is a top plan view of fruit transport clamps as used in the machine of Figure 1.

Figure 10 is a vertical sectional view of an alternate fruit transport device.

Figure 11 is a detailed plan view, partly in section, taken as indicated by the arrow 11 in Figure 10.

Figure 12 is a diagram showing the time cycle curves for the machine of Figure 1 and also for the machine incorporating the alternate transport device shown in Figure 10.

Figure 1:
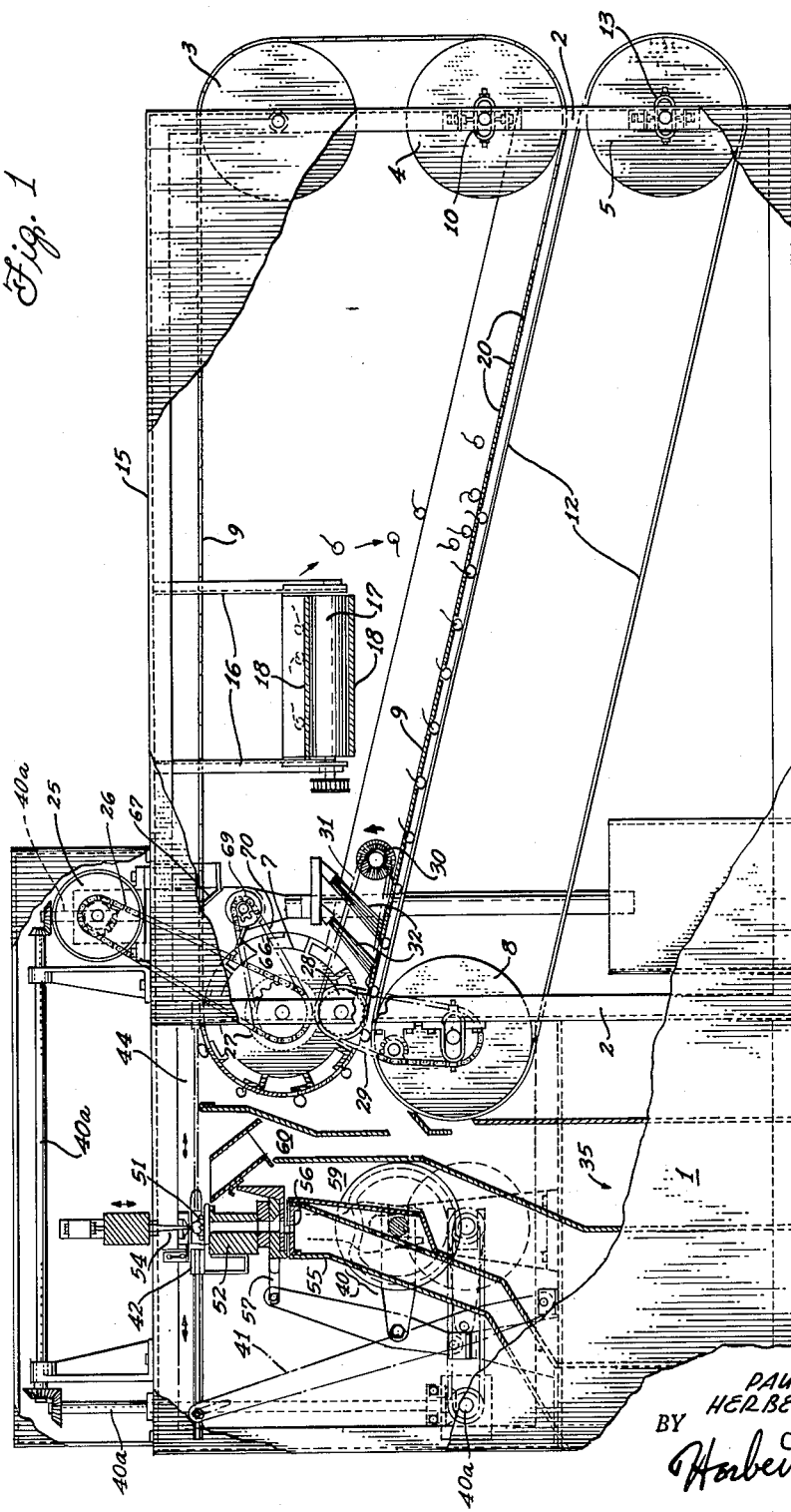
Figure 1 is a longitudinal, vertical view, partly in section and partly in elevation, of a preferred form of orientator-stemmer and pitter embodying the present invention.
Figure 2:
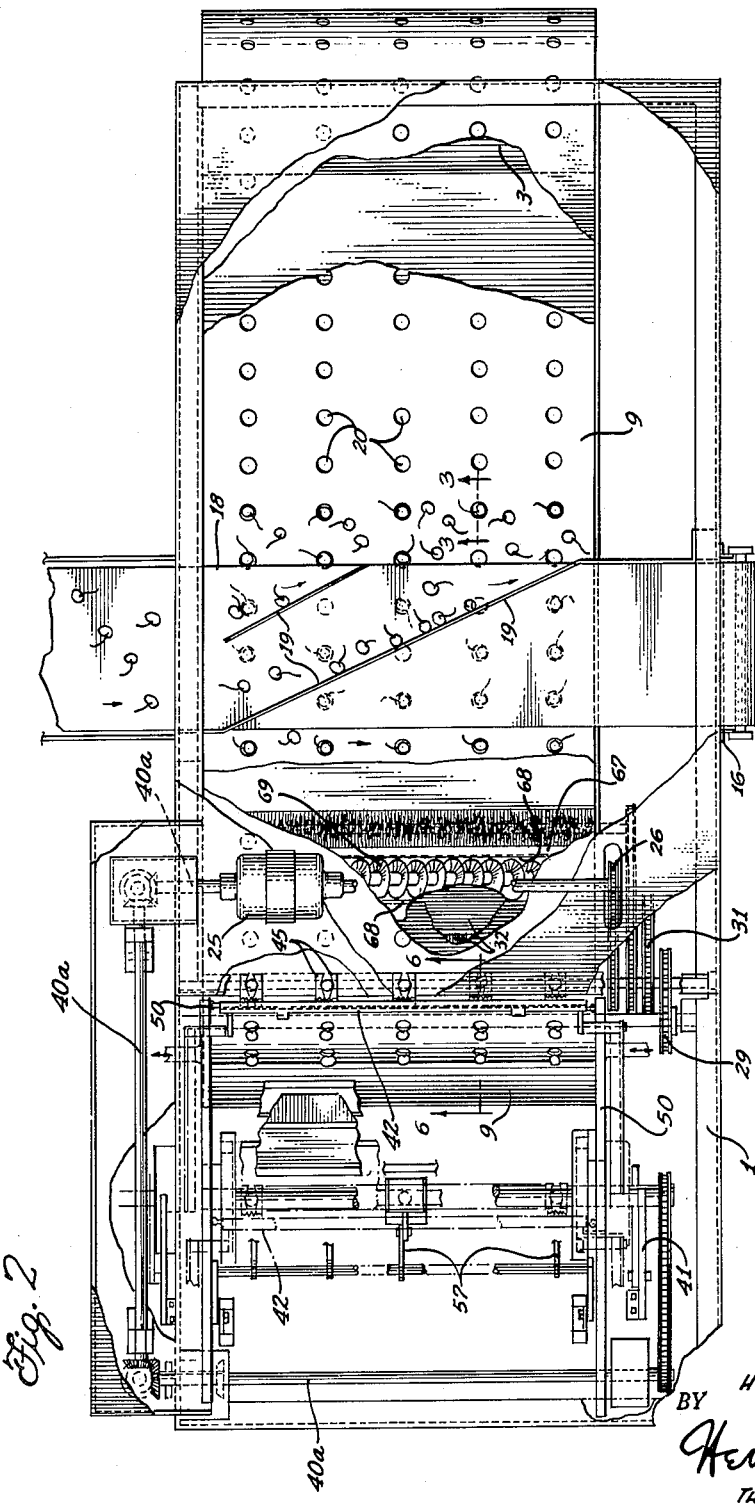
Figure 2 is a top plan view, partly cut away to show underlying details of the machine of Figure 1.

Referring first to Figures 1 and 2 for the general structure of the machine, a main frame 1 is supported on upright legs 2 and carries at one end a pair of adjacent, vertically spaced upper belt rollers 3 and 4, and a spaced lower belt roller 5.

At the other end of the machine is positioned a gripper drum 7 and below it a lower belt drive roller 8. An upper carrier belt 9 is passed around gripper drum 7, and upper belt rollers 3 and 4. The upper carrier belt 9 is kept tight by upper belt adjustment means 10 of any well known type on the upper carrier belt roller 4. In a similar manner, a lower support belt 12 is passed around lower belt roller 5 and lower drive roller 8 and is kept tight by support belt adjustment means 13 of any well known type.

The various rollers are positioned on frame 1 so that the top extent of the upper carrier belt 9 is substantially horizontal, the bottom extent of the upper carrier belt and with the top extent of the support belt 12 being closely adjacent, parallel and rising toward the gripper drum 7.

Top bars 15 of frame 1 support on brackets 16 a feed belt roller 17 forming a support for a feed belt 18 extending across and above the combined carrier and support belts 9 and 12, respectively, the other end of feed belt 18 being supported and driven at a point away from the side of the machine by means not shown. Diagonal scraper bars 19 extend across the feed belt 18 above the combined carrier and support belts so that fruit on top of the feed belt 18 is diverted to fall onto carrier belt 9.

Carrier belt 9 is provided with a plurality of fruit receiving apertures 20 preferably aligned both lengthwise and crosswise of the belt, as best shown in Figure 2. The apertures 20 are sized to admit cherries of the maximum size being processed so that they may pass through apertures 20 and rest on support belt 12.

Support belt 12a may be relatively thin and spaced below carrier belt 9 a sufficient distance so that large fruit resting thereon will have their top surface point substantially level with the upper surface of the carrier belt 9, as shown in Figure 3, or may be relatively thick and provided with fruit receiving recesses 21, as shown in Figure 4, the openings of which are registered with the apertures 20 in the carrier belt. In order that both belts remain taut and in order that the recesses 21 remain in registry during progression of the belts, the belts are preferably made from rubber impregnated canvas. As will be brought out later, when the support belt is thin and without apertures as shown in Figure 3, it is preferably progressed at a slightly faster rate than the rate at which the carrier belt is progressed. However, when the support belt is thick, and provided with recesses 21 as shown in Figure 4, the belts are progressed synchronously.

On the down-side of each aperture 20, a notch 22 is provided, extending into each aperture, the use of these notches being described later.

The upper carrier belt 9 and the lower support belt 12 are progressed toward the gripper drum 7 while being superimposed, by a motor 25 driving gripper drum 7, through gripper drum chain 26. A drum gear 27 meshes with an idler gear 28. Idler gear 28 drives lower drive roller 8 through a drive roller chain 29 and also rotates a brush 30 through brush chain 31. Brush 30 is positioned to meet the cherries rising on carrier belt 9, and is set to bear against the upper surface of the carrier belt 9 all the way across the carrier belt. Brush 30 is connected to rotate with its lower surface moving contra to the motion of the carrier belt 9. The use of the brush 30 insures that no fruit except those in the apertures of the carrier belt are progressed to the gripper drum and further insures that the majority of stems on the fruit are rearwardly extending.

However, in order that maximum stem orientation may occur, it is preferred to pass the fruit under one or more slanting, non-rotating brushes 32. Such brushes have been found to be very effective in straightening the stems of the fruit to trail properly.

When the support belt 12 is thin and without recesses 21, the drive between gripper drum and lower drive roller 8 is proportioned to drive lower support belt 12 slightly faster than the carrier belt. This action causes the cherries to be rolled by friction in a direction to hold the stems thereof firmly in notches 22 after having once entered these notches. When a thick support belt with recesses 21 is used, the belts are synchronously driven.

After the fruit has passed brushes 30 and 32, the carrier belt 9 and the gripper drum 7 meet, and the carrier belt 9 and the support belt 12 separate, the carrier belt 9 progressing upwardly around the gripper drum 7 with the support belt 12 progressing downwardly around the lower drive roller 8. All fruit having stems long enough to be gripped between the carrier belt 9 and the outer surface of the gripper drum 7 will be carried upwardly, while fruit with no stems, or stems too short to be gripped will be carried around on the lower support belt 12 to roll into a discard chute 35, best shown in Figure 1.

With the exception of notches 22, the mechanism so far described is very similar to certain aspects of a fruit stemmer shown, described and claimed in a copending application Serial No. 156,256, filed April 17, 1950, now U. S. Patent No. 2,668,619 dated February 9, 1954, one of the present inventors (Wormser) being a joint inventor of said stemmer. In that device, the fruit, after being gripped by the stems thereof, is carried upwardly around the gripper drum to meet a separation device which breaks the fruit loose from the gripped stems without regard to fruit position. The present invention is primarily directed to two additional features: first, to obtain best orientation of the stems; and second, to insure that the fruit is removed from the drum and held in a position directly related to stem position so that the fruit can be pitted along a predetermined axis.

To that end, and to insure best stem location, the notches 22 are used in the edges of the apertures 20. It has been found that while many stems are curved, they are generally fairly straight near the stem indent of the fruit. During the brushing of the carrier belt by brushes 30 and 32, the stems of the fruit, both straight and curved, tend to fall into the notches 22. Once the stems are in the notches, they tend to stay there, and even though the stems are curved, such as stem C in Figure 5, the engagement of the stem in the notch 22 resists turning of the fruit during additional brushing. Thus a large percentage of the fruit is orientated by the brushing to have their stems in the notches after brushing. As the notches are relatively close to the fruit, the fruit having their stems in the notches 22 are held with their stem indents in a predetermined position.

Referring again to Figures 1 and 2, the stems of the fruit are, as above stated, gripped between the exterior surface of the gripping drum 7 and the drum contacting surface of the carrier belt 9, thus carrying the fruit attached to the stems upwardly and on the outside of the carrier belt periphery, the fruit tending, by gravity, to bend the stem so that when the fruit reaches the top of the gripper drum 7, the stem indents of the fruit, the stems of which are in notches 22, are down. At this point means are provided to grip the fruit, move it away from the gripper drum with the indent down, to leave the stem gripped on the gripper drum, and then to pit the fruit through the tip-indent axis. In the modification shown in Figures 1 and 2, this transfer of the fruit is accomplished by the use of the transfer mechanism shown, described and claimed in detail in the copending application of Doering et al., referred to above, as modified by the use of the fruit clamps disclosed by Carroll in his patent cited above.

The transfer mechanism shown in Figures 1 and 2 includes a cam assembly 40 driven from motor 25 through drive links 40a. One of the cams in this assembly drives an upright arm 41 which in turn reciprocates a transfer bar 42 along a slot in a side plate 44.

Transfer bar 42 carries, opening toward gripper drum 7, a plurality of fruit clamps of the Carroll type above referred to, best shown in Figure 9. The clamps have two opposed concave clamp arms 45 held together by spring 46 and opened by push rods 47 extending parallel along transfer bar 42, each push rod having alternate lugs 48 thereon, with a lug on each rod engaging opposite clamp arms 45. Thus, when the push rods 47 are moved inwardly from opposite ends of transfer bar 42, the clamp arms will open. When the rods are released, springs 46 will close the arms and move the rods back to their original position.

Each push rod 47 is provided with an end roller 49 bearing on clamp cams 50, there being one clamp cam 50 on each side of the transfer bar. Motion of the clamp cams 50 laterally is controlled by a cam in the cam assembly 40 by a linkage not shown. The timing of the clamp cams 50 will be described in detail later in conjunction with the description of Figure 12.

Transfer bar 42, with its clamps thereon, is reciprocated from a position at one end of its stroke where the fruit, as it arrives at the top of gripper drum 7, will be enclosed by the clamp arms 45, the forward portions of these arms being for the moment stationary and resisting further movement of the fruit by the drum. This separates the fruit from its gripped stem. The grasped fruit is then carried in closed clamp arms to be positioned over a pitting rubber 51 mounted on a pitting anvil bar 52 which, because of the concavity of the pitting rubber 51, is dropped by action of cam assembly 40 until the fruit arrives above the rubber, when it is raised to contact the lower side of the fruit. A pitting knife 54 is then driven vertically through the fruit to push the pit therefrom into a pit discard chute 55. If the fruit was properly orientated on the gripper drum by the stem, the fruit will be pitted substantially through the tip indent axis. In the Doering structure illustrated a pit inspecting device 56 operated by a selector bar 57 is also used but as this inspector is no part of the present invention it will not be described in detail herein.

After the fruit has been pitted, the transfer bar 42 returns toward the gripper drum 7 and the clamp arms 45 are opened to permit the cherry to drop. If the inspector 56 is in use, the fruit will drop into a properly pitted fruit chute 59, or into an improperly pitted fruit chute 60, in accordance with the presence or absence of a pit in the pit inspection device 56. When no pit inspection is used, all the pitted fruit can be dropped directly into an output chute.

From the above description it will be seen that all fruit whose stems are positioned at or near the notches 22 on the edges of apertures 20 will be pitted with the indent down. It is also to be noted that the facing concavities of the clamp arms 45 will tend to center fruit which may be somewhat off the center of the clamps because of the fact that the stems are near but not in the notches 22.

However, if the surface of gripper drum 7 were to be of uniform diameter throughout, the stems of all fruit having stems long enough to be gripped would be gripped irrespective of the stem position with respect to the notches, and there would always be a percentage of fruit the stems of which would not be properly orientated with respect to the notches 22 by the action of brushes 30 and 32. It is desirable that such improperly orientated fruit be not carried upwardly around the carrier drum, and an inspection device to prevent the stems of fruit improperly orientated from being gripped is best shown in Figures 6, 7, 8, and 9.

Referring next to these figures, the gripper drum 7 is made to have a plurality of peripheral lugs 65, as shown in Figure 7. The number and spacing of the lug 65 on the gripper drum 7 is such that one lug registers with each aperture 20 on the carrier belt in such a manner that each lug contacts the carrier belt in the immediate vicinity of notch 22 on the edge of the apertures 20, as best shown in Figure 7. The lugs 65 are sufficiently long to adequately support the carrier belt. They extend, below each aperture 20, both in the front and the rear of the notch area, thereby providing a substantial lug-notch area matching leeway. If creep of the belt with respect to the gripper drum should occur, exact synchronism can readily be obtained by notching one or both belt edges and providing mating teeth on the gripper drum. However, when tight, non-stretching belts are used, creep is insignificant in long runs of the machine.

The width of lugs 65 across the edges of the apertures at the notch areas thereof will determine the stem position range over which the stems will be gripped between the carrier belt and the gripper drum lugs. As shown in the diagram of Figure 8, a satisfactory lug width for general orientation can be such as to cause stems lying within a 15° angle around the aperture edge on each side of the notch center line to be gripped. As the lugs do not contact the carrier belt over the remainder of the periphery, stems outside of the 30° gripping angle are not gripped, and will fall out of the carrier belt by gravity, as indicated by cherry IO in Figure 6, because they are improperly orientated. Thus at the point where the carrier belt 9 separates from the support belt 12, all improperly orientated fruit IO, all fruit SS with short stems; and all fruit NS with no stems will be automatically discarded. It is preferred that the lugs 65 extend sufficiently radially outwardly of their gripper drum support so that the spaces S between lugs 65 are deep enough to prevent ungripped fruit stems from hanging up therein, so that they can fall out freely.

Thus as the fruit approaches the transfer position, as shown in Figure 9, only such fruit as have stems properly orientated within the desired range will be present. The permissible range will, of course, depend on the pitting accuracy desired, and for maximum orientation accuracy the lugs can be made only as wide as the notches 22. However, as clamp arms 45 can readily center fruit displaced somewhat laterally on the carrier belt at the transfer position, narrow lugs 65 are not usually necessary.

After the cherries have been grasped by clamp arms 45, the stems are carried past the transfer position and removed from the gripper drum 7 and carrier belt 9 by scrapers 66 and 67, respectively, as shown in Figures 1 and 2, and removed laterally in a trough 68 by a worm 69, driven from the gripper drum 7 by worm chain 70.

It is also practical to use a vacuum grasp transfer as disclosed in the Doering et al. application cited above, with only a slight modification of this transfer, as such transfer can readily be applied to the machine of Figures 1 and 2. Such modifications are shown in Figures 10 and 11. In this case transfer bar 42 is made hollow and connected to a vacuum pump (not shown) under the control of a valve (not shown) operated from cam assembly 40. Transfer bar 42 has positioned thereon a plurality of vacuum inlet nozzles 75 having a spring extended tip 76, the front face 77 of which is contoured to fit average fruit curvature. A vacuum bore 78 opens in the center of front face 77.

As the vacuum attraction for the fruit cannot be relied upon to be strong enough for breaking all cherries away from the gripped stems, a stationary stemming bar 79 is placed across the carrier belt 9 at the transfer position. This stemming bar is provided, in line with each row of apertures, with fruit centering cutouts 80 preferably of triangular shape. Thus the stationary stemming bar acts similarly to the forward ends of clamp arms 45 at the fruit-stem separation position. In this device, the timing is such that the tips 76 of the inlet nozzles 75 approach the fruit just prior to the time it reaches the stationary stemming bar 79 and the transfer bar 42 is given sufficient over-travel so that when a cherry reaches the cutout 80 in the stemming bar 79 and is being separated from its gripped stem, the front face 77 of the nozzle 75 will be forced against the cherry surface, with full vacuum on, thereby causing the destemmed cherry to be held and transported, as was the clamped cherry previously described, to the pitting rubber 51 mounted on anvil bar 52, which as described above is dropped momentarily to avoid pitting rubber contact with the fruit arriving thereover on the nozzle 75. On the return stroke of the transfer bar 42, after the fruit has been pitted, positive pressure is momentarily substituted for the vacuum, and the fruit drops off the nozzle into the output chute or chutes as previously described.

Figure 12 is a chart showing, as separate curves, complete cycle times and strokes of the various parts as controlled by the action of the cam assembly 40. This chart includes curves for both the vacuum and clamp transfer mechanism as well as the timing curve for the operation of the pit inspection device 56, which as pointed out above is no part of the present invention.

In Figure 12 the cycle is shown of one complete revolution (0–360°) of the cam assembly 40 in terms of inches of travel. The cycle has been illustrated to start just prior to pitting, with the anvil bar 52 up, as shown by vurve A on the chart; with the selector bar 57 stationary, as shown by curve B on the chart; with the transfer bar 42 stationary as indicated by curve C; and with the pitting knife moving downwardly as shown by curve D.

When vacuum nozzles 75 are used on transfer bar 42, negative pressure (suction) is provided at all times except between points x and y on curve C, where compressed air is injected into vacuum bores 78 to remove the fruit from the nozzle 75. When clamp arms 45 are used, clamp arms 45 are closed on the cherry at the start of the cycle, as illustrated by curve E, on the chart of Figure 12.

As the cycle proceeds, the pitting knife 54 reaches its full downward stroke at about 30° and starts back upwardly to become stationary at about 75°. Just prior to this point, at about 70°, the selector bar 57 starts moving, and the anvil bar 52 drops. As the anvil bar drops, transfer bar 42 moves the pitted cherry back toward the conveyor and pushes it off the pitting rubber 51 and anvil bar 52.

At 95°, when vacuum grasping is being used, suction is shut off and as the cherry is moved toward gripper drum 7 it is blown off the end of vacuum nozzle 75. When clamp arms 45 are used, clamp cams 50 are moved toward the transfer bar to open clamp arms 45 and release the cherry. Both devices release the cherry in about the same position.

In the meantime, irrespective of which grasping means is used, the selector bar 57 (when used) is moved sufficiently to condition the output chutes 59 or 60 in accordance with the presence or absence of a pit in the pit inspecting device 56.

The transfer bar 42 then continues to move toward the gripper drum 7, and the selector bar 57, when used, moves back to discharge the pit, if present. The selector bar then remains stationary until the next cycle. At 160° vacuum is reestablished in the nozzles 75, when used, but when clamp arms 43 are in use, they are held open.

At about 200° the transfer bar 42 reaches its gripper drum end of its stroke, preferably moving with the gripper drum along the tangent thereto. When the nozzles 75 are used, the cherry is picked up as it is separated from its stem by stemming bar 79. When the clamps are used, the clamp cams 50 are moved to close the clamp arms 45 on the cherry, these arms remaining closed until opened for discharge at 95°.

The transfer bar 42 is then returned rapidly to place the grasped cherry in either case over the pitting rubber 51. At about 335° the anvil bar 52 rises and the cycle repeats with the pitting knife starting down at 345°.

Thus, each part is connected to give its proper motion when the motor 25 is rotated. In one particular embodiment of the device found practical and highly satisfactory for the stem orientation and pitting of cherries, the stroke of the transfer bar 42 is six inches horizontally, the pitting knife 54 has a 1½ inch vertical stroke, the anvil bar 52 a vertical stroke of 5/32 of an inch, and the selector bar 57 is given a horizontal stroke of three inches, all as indicated in Figure 12.

Thus, with 48 R. P. M. of the cam assembly 40 in one particular embodiment, for example, 48 cherries can be pitted per minute from each aperture row, and with 20 carrier belt rows of apertures, 960 cherries per minute is the possible output when all stems are properly orientated on the carrier belts.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

We claim:

1. In a machine for orientating fruit, a drum rotatable on a substantially horizontal axis, a carrier belt mounted to pass around said drum, means to rotate said drum to progress said belt around said drum from the bottom to the top thereof, said belt having a plurality of apertures therein having a diameter slightly greater than the fruit to be orientated, means for loading unstemmed fruit in said apertures with the stems of said fruit gripped between the outer surface of said drum and the inner surface of said belt adjacent said apertures, said fruit being held solely by said stems as said carrier moves around said drum, fruit transport means reciprocable over a horizontal path tangential to said drum at the top of said drum, means for reciprocating said transport means, fruit grasping means carried by said transport means, said transport means being synchronized to place said grasping means in a position to grasp the fruit as they arrive at the top of said drum, means for operating said grasping means to grasp said fruit when said fruit reaches the top of said drum, the reverse motion of said transport means separating the grasped fruit from the gripped stem.

2. Apparatus in accordance with claim 1 wherein means are provided on said drum to grip only stems substantially extending in a predetermined direction.

3. In a machine for carrying fruit with stems thereon, an upper member having apertures therein large enough to pass fruit therethrough, a lower imperforate member positioned beneath said upper member, the distance between the upper surfaces of said members at said apertures being substantially that of the average diameter of the fruit being carried, means for loading fruit with stems thereon through the apertures in said upper member to rest on said lower member, and means for progressing said upper member, a third member positioned to have a surface in contact with the upper surface of said upper member and mounted to move therewith to grip the stems of said fruit projecting from said apertures, said lower member being positioned to terminate support of said fruit after said stems have been gripped, means positioned in the path of the fruit projecting from the lower surface of said upper member to oppose further motion of said fruit and thereby separate said fruit from the gripped stems thereof, and means for grasping the separated fruit at the instant of separation to maintain the position of the fruit, said grasping means being movable to remove said fruit from said carrier while holding fruit in the grasped position.

4. In a machine for orientating fruit to a predetermined position, a rotatable drum, an endless carrier supported to have a fruit supporting portion terminating in a curving portion in contact with the periphery of said drum, means for progressing said carrier toward and around a portion of the periphery of said drum, said carrier having a plurality of spaced fruit receiving apertures sufficiently large for fruit having stems thereon to pass therethrough, means for supplying unstemmed fruit to the top of the fruit supporting portion of said carrier, brush means for spreading said fruit to enter and fall through said apertures by gravity, and to direct said stems of said fruit in a common direction, a fruit supporting member beneath said carrier along the fruit supporting portion of said carrier, said fruit supporting member being imperforate beneath said apertures to prevent fruit entering said apertures with stems down, said member being spaced a distance below said carrier to support fruit passing through said apertures with only the stems of fruit of the average size being stemmed extending above the upper surface of said carrier whereby said latter stems only are gripped between the surface of said carrier and the periphery of said drum, said member terminating as said carrier and drum meet to grip said stems, said fruit being carried around said drum solely by the gripped stem thereof, and fruit grasping means movable along a horizontal path tangential to and toward said curved carrier position and shaped to grasp a fruit held by the gripped stem thereof, said fruit grasping means being movable in the reverse direction along said path to separate said fruit from the gripped stem thereof.

5. Apparatus in accordance with claim 4 wherein a notch is provided in the top of said fruit supporting portion of said carrier adjacent each of said apertures, each of said notches starting at the top of said fruit supporting portion and extending into the adjacent aperture slightly below said top thereof to receive and stabilize a normal stem from a fruit in said aperture in a position extending upwardly and outwardly in said common direction with a portion of said stem above said top.

6. Apparatus in accordance with claim 4 wherein a notch is provided in the top of said fruit supporting portion of said carrier adjacent each of said apertures, each of said notches starting at the top of said fruit supporting portion and extending into the adjacent aperture slightly below said top thereof to receive and stabilize a normal stem from a fruit in said aperture in a position extending upwardly and outwardly in said common direction with a portion of said stem above said top, and wherein means are provided on said drum positioned to grip only such stems as are in said notches and those lying in a predetermined limited angular range on each side of said notches.

References Cited in the file of this patent

UNITED STATES PATENTS

| | | |
|---|---|---|
| 1,076,794 | Smith | Oct. 28, 1913 |
| 1,403,852 | Ensele | Jan. 17, 1922 |
| 1,409,802 | Urschel | Mar. 14, 1922 |
| 1,409,803 | Urschel | Mar. 14, 1922 |
| 1,409,804 | Urschel | Mar. 14, 1922 |
| 1,694,263 | Howson | Dec. 4, 1928 |
| 1,734,788 | Babcock | Nov. 5, 1929 |
| 1,784,347 | Frova | Dec. 9, 1930 |
| 2,059,546 | Brandenburg | Nov. 3, 1936 |
| 2,194,058 | Urschel | Mar. 19, 1940 |
| 2,243,530 | Kok | May 27, 1941 |
| 2,318,805 | Silva | May 11, 1943 |
| 2,358,500 | Frova | Sept. 19, 1944 |
| 2,360,412 | Frova | Oct. 17, 1944 |
| 2,361,834 | Frova | Oct. 31, 1944 |
| 2,375,350 | Coons | May 8, 1945 |
| 2,406,311 | Ashlock | Aug. 27, 1946 |
| 2,415,418 | Coons | Feb. 11, 1947 |
| 2,462,682 | Schubert | Feb. 22, 1949 |
| 2,528,293 | Ashlock, Jr. | Oct. 31, 1950 |
| 2,558,205 | Ashlock, Jr. | June 26, 1951 |
| 2,609,913 | Doering et al. | Sept. 9, 1952 |

FOREIGN PATENTS

| | | |
|---|---|---|
| 446,505 | France | Dec. 7, 1912 |
| 392,110 | Germany | Mar. 15, 1924 |
| 631,894 | France | Dec. 28, 1927 |
| 819,314 | France | Oct. 14, 1937 |